United States Patent [19]

Currie

[11] 4,102,028
[45] Jul. 25, 1978

[54] OPTICAL ENCODER ASSEMBLY AND CENTERING FIXTURE

[75] Inventor: Richard Kenneth Currie, Santa Barbara, Calif.

[73] Assignee: Anton J. Blaser, Santa Barbara, Calif.

[21] Appl. No.: 786,658

[22] Filed: Apr. 11, 1977

[51] Int. Cl.² ............................................. B25B 27/14
[52] U.S. Cl. ................................................. 29/281.5
[58] Field of Search ....................... 29/281.5, 271, 272, 29/428; 85/50 R

[56] References Cited

U.S. PATENT DOCUMENTS

| 2,050,542 | 8/1936 | Pace | 85/50 R |
| 2,304,155 | 12/1942 | Dyball | 85/50 R |
| 3,123,902 | 3/1964 | Isenbarger | 29/271 |

Primary Examiner—James L. Jones, Jr.
Attorney, Agent, or Firm—Ralph B. Pastoriza

[57] ABSTRACT

A disc shaped element has a central hole of diameter corresponding to the diameter of a motor shaft upon which an optical encoder assembly is to be mounted. Coaxial with the central hole is a decreased diameter portion dimensioned to be received in a mounting member component of the assembly carrying the light source for the optical encoder. Exact coaxial centering of the mounting member carrying the light source is maintained by the disc shaped element while the mounting member is rigidly secured to the motor itself. Thereafter, the disc shaped element can be removed and the remaining components of the optical encoder assembled with assurance of proper alignment between the light source and the photo cell part of the assembly.

3 Claims, 3 Drawing Figures

OPTICAL ENCODER ASSEMBLY AND CENTERING FIXTURE

This invention relates generally to optical encoders provided in kit form for assembly on motor shafts to provide output pulses at a frequency determined by the RPM of the motor. More particularly, the invention has to do with a unique centering fixture in combination with an optical encoder for facilitating the assembly of the optical encoder on the motor.

BACKGROUND OF THE INVENTION

Optical encoders or tachometers are well known in the art. Basically, these devices comprise a stationary light source arranged to be mounted on a motor close to the motor shaft, a stationary receiving photoelectric cell in alignment with the light source and a rotating shutter arranged to be secured to the motor shaft to rotate between the light source and photo cell and thus optically generate a series of pulses of frequency corresponding to the RPM of the motor. In these assemblies, it is vitally important that the light source and photo cell be properly aligned with respect to the rotating shutter in order that usable output pulses are properly generated. Any misalignment could result in the absence of pulses or very weak pulses if the full apertures defined by the rotating shutter are not utilized.

There is generally no problem when an optical encoder is installed on a motor in the factory. Proper alignment jigs and the like are readily available and once the installation is complete on the motor, there is ordinarily no problem of misalignment unless an ultimate user attempts to disassemble the optical encoder from the motor and attempts to reassemble the same himself.

On the other hand, it is presently common practice to provide optical encoder kits which may be shipped directly to a user and assembled by the user himself on a motor. Normally, the basic component of the assembly constitutes a mounting member carrying the light source. This member is provided with a central bore normally of diameter greater than the motor shaft diameter of any particular motor with which the encoder is to be used. The larger diameter central bore is necessary to provide a definite clearance between the rotating shaft and the mounting member carrying the light source which latter member is fixed to the motor and stationary. The next component of the assembly constitutes the shutter member which is mounted directly on the motor shaft. Finally, an appropriate photocell detector overlies the shutter member and is affixed to the mounting member.

Because of the larger diameter central bore of the mounting member relative to the motor shaft, in affixing the mounting member to the motor in a stationary position, it is essential that it be exactly coaxially centered relative to the motor shaft. Otherwise, the rotating shutter will be out of alignment with the light path from the light source to the photo cell all as described heretofore.

In view of the foregoing, it is customary to provide a centering means such as a bar with a V-groove affixed to the mounting member at the factory to permit exact centering of the mounting member prior to securing it to the motor. After securement of the mounting member, this centering bar or fixture can be disconnected. However, if it is ever desired to remove the optical encoder and place it on another motor or even reassemble it on the same motor, the mounting member must be sent back to the factory for proper securement of the bar fixture thereto in order that proper centering can again be achieved.

BRIEF DESCRIPTION OF THE PRESENT INVENTION

With all of the foregoing considerations in mind, the present invention contemplates the provision of an improved centering fixture and optical encoder combination which does not require any factory preadjustment, all to the end that assembly of encoders on motors by an ultimate consumer can readily be carried out with assurance of exact alignment.

Briefly, the centering fixture comprises a disc shaped element having a central hole of diameter corresponding to the diameter of the motor shaft to receive the shaft in a friction fit. This element further includes a reduced external diameter portion through which the hole passes in exact coaxial relationship. The reduced external diameter of this portion corresponds to the internal diameter of the central bore in the mounting member so that the reduced external diameter portion is receivable in a friction fit in this central bore.

With the foregoing arrangement, the hole in the element receives the motor shaft and the reduced external diameter portion of the element is received in the central bore of the mounting member so that the mounting member is precisely centered in coaxial relationship to the shaft and may then be secured to the motor. The disc shaped element can thereafter be removed from the shaft so that the remaining components of the optical encoder assembly can be properly assembled on the mounting member with assurance that the light source is properly positioned relative to the rotating shutter.

The encoder can be removed from the motor and positioned on another motor utilizing the same centering fixture assuming that the other motor shaft diameter is the same. If the other motor shaft diameter is different, a different centering fixture having a hole corresponding to the different diameter can be used. In other words, the encoder kit may include several centering fixtures with different diameter holes corresponding to different diameter motor shafts with which the encoder may be used.

The present invention thus avoids problems of initial factory adjustments of a fixture and the ensuing disadvantage of having to return components to the factory for readjustment.

BRIEF DESCRIPTION OF THE DRAWINGS

A better understanding of this invention will be had by referring to the accompanying drawings in which.

DETAILED DESCRIPTION OF THE PREFERRED EMBODIMENT

Figure 1:
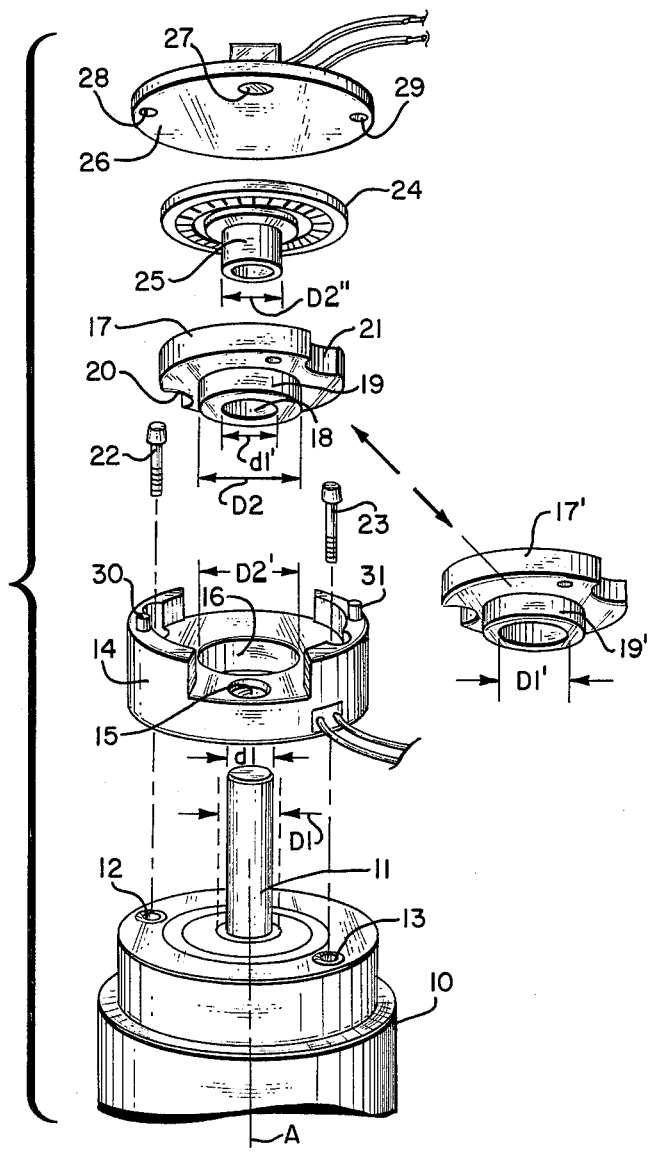
FIG. 1 is an exploded perspective view of the basic components making up an optical encoder together with the centering fixture of this invention preparatory to assemblying the same on a motor.

Referring to FIG. 1, there is shown in the lower portion a motor 10 having a shaft 11 and appropriate mounting tapped openings 12 and 13 to support an optical encoder assembly. The encoder assembly itself includes a mounting member 14 carrying a light source 15 adjacent to a peripheral point. The mounting member 14 itself includes a central bore 16 of greater diameter than the diameter of the motor shaft 11.

Shown above the mounting member 14 is a disc shaped element 17 constituting the centering fixture of this invention, this element not properly constituting a part of the encoder itself but merely being supplied to assure proper assembly of the encoder. Disc shaped element 17 includes a central hole 18 of diameter corresponding to the diameter of the motor shaft 11 to receive the shaft in a friction fit. In FIG. 1, the diameter of the motor shaft 11 is indicated at $d1$ while the diameter of the central hole 18 of the disc shaped element 17 is designated $d1'$. The difference in the diameters $d1$ and $d1'$ is sufficiently small as to assure a friction fit wherein any friction is not of such magnitude as to prevent manual insertion of the shaft in the bore or manual removal of the shaft from the bore.

Disc shaped element 17 as shown in FIG. 1 further includes a reduced external diameter portion 19 through which the hole 18 passes in exact coaxial relationship. This reduced external diameter portion 19 has a diameter corresponding to the internal diameter of the central bore 16 of the mounting member 14. Thus, as indicated in FIG. 1, the diameter of the reduced external diameter portion 19 is indicated at D2 whereas the diameter of the central bore 16 of the mounting member 14 is indicated at $D2'$. Again, the difference between these diameters is sufficiently small that a friction fit results, the friction not being so great as to prevent manual insertion of the external diameter portion 19 within the central bore 16.

It will now be appreciated that when the central hole 18 of the disc shaped element 17 receives the shaft 11 of the motor and the central bore 16 of the mounting member 14 receives the reduced external diameter portion 19, the mounting member 14 will necessarily be positioned in exact coaxial centered relationship relative to the motor shaft 11. When the mounting member 14 is so positioned in exact centered relationship, it is then secured to the motor 10.

In the particular embodiment illustrated, the disc shaped element 17 includes diametrically opposite cutouts 20 and 21 to permit appropriate bolts or screws 22 and 23 to pass through the mounting member 14 and be received in the tapped openings 12 and 13 of the motor 10 to accomplish the desired fastening. In this respect, appropriate screw or bolt holes of larger diameter than the screws 22 and 23 are provided in the mounting member 14 which will permit slight lateral movements of the mounting member 14 relative to the motor 10 prior to tightening of the screws 22 and 23. Accordingly, close tolerances on the position of the tapped openings 12 and 13 on the motor 10 relative to the screw receiving openings in the mounting member 14 are not essential. Once the screws 22 and 23 are properly tightened in the tapped openings 12 and 13 of the motor with the disc shaped element 17 in position on the mounting member 14 and shaft 11, it is assured that the mounting member 14 is precisely centered relative to the shaft 11 and that the light source will be at the proper radial distance from the axis of the shaft 11 for alignment with the remaining components of the encoder assembly.

Referring now to the upper portion of FIG. 1, the foregoing mentioned remaining components of the encoder assembly include a shutter 24 which may take the form of a disc having circumferentially uniformly spaced light apertures and a central hub 25. Hub 25 includes a central hole for receiving the shaft 11 of the motor in a force fit so that the shutter 24 is essentially fixed to the shaft 11 for rotation therewith. The external diameter of the hub 25 is indicated at $D2''$, slightly less than the diameter $D2'$ of the central bore 16 in the mounting member 14 so as to clear this central bore when the motor shaft 11 is rotating rapidly.

The assembly is completed by a cover disc 26 including a photocell 27. Indexing holes 28 and 29 are provided on the disc 26 for registration with appropriate indexing pins 30 and 31 formed on the mounting member 14 such that the photocell 27 will be in exact alignment with the light source 15 and the sequential apertures of the shutter disc 24.

Shown to the right of the exploded view of FIG. 1 is an additional centering fixture 17' having a reduced external diameter portion 19' but a central hole of diameter $D1'$ greater than the motor shaft 11 diameter $d1$. This particular centering fixture or disc shaped element 17' is designed for use with a different motor from the motor 10 illustrated in FIG. 1 which would have a shaft of larger diameter corresponding to the diameter $D1'$. Such larger diameter shaft is schematically indicated in FIG. 1 by the dashed lines, the larger diameter being designated D1.

The showing of the additional centering fixture or disc shaped element 17' is merely to illustrate the fact that an encoder assembly provided in a kit form may include more than one centering fixture so that the same encoder can be mounted on motors having shafts of different diameters.

Figure 2:
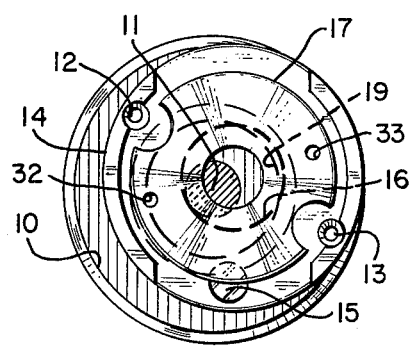
FIG. 2 is a top plan view looking along the axis of the motor shaft with the centering fixture in position on the mounting member preparatory to being assembled on the motor wherein the view itself shows a misalignment.

FIG. 2 illustrates the mounting member 14 of FIG. 1 with the disc shaped element 17 properly positioned with its reduced external diameter portion 19 received within the central bore 16 of the mounting member but wherein these two assembled components are off-center from the shaft 11 of the motor. In the showing of FIG. 2, the mounting member 14 and disc shaped element 17 are in front of the shaft 11, this shaft not as yet having been received in the central hole 18 of the disc shaped element 17.

Figure 3:
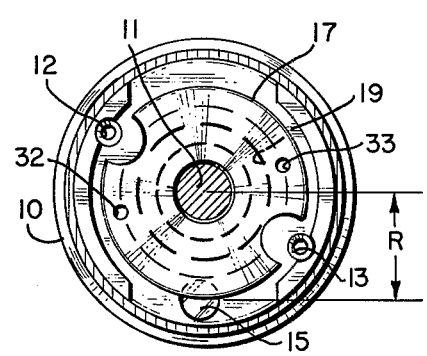
FIG. 3 is a view similar to FIG. 2 illustrating the proper center positioning of the mounting member on the motor as a consequence of utilizing the centering fixture.

FIG. 3 illustrates the situation wherein the shaft 11 of the motor has been properly received in the central hole 18 of the disc element 17 wherein it will be evident that the element has served to precisely coaxially center the mounting member 14 relative to the shaft 11. When the components are in the position illustrated in FIG. 3, the screws 22 and 23 described in FIG. 1 will then be passed through the appropriate openings in the mounting member 14 to the tapped holes or openings 12 and 13 in the motor and tightened to thereby rigidly secure the mounting member 14 to the motor.

As described heretofore, the disc shaped centering element 17 is then removed from the shaft 11 and the remaining components described in FIG. 1 of the encoder can then be assembled. Since it is assured that mounting member 14 is exactly coaxially centered relative to the motor shaft 11, proper alignment of the light source 15, circumferential apertures of the shutter 24 and the receiving photocell 27 is assured.

Because of the extremely close tolerances between the reduced external diameter portion 19 of the disc shaped element and the central bore 16 of the mounting member 14, it is possible that the friction fit may be such as to render it difficult to remove the disc shaped element 17 from the mounting member 14 after the mounting member has been properly centered and fastened to the motor 10. To facilitate removal of the disc shaped element, this element is provided with at least two circumferentially spaced small holes shown in FIG. 2 at 32 and 33 between its reduced external diameter portion 19 and its periphery. These holes run parallel to the axis of the disc shaped element. In the event that the friction fit between the reduced external diameter portion 19 and central bore 16 is such as to render it difficult to remove the disc shaped element 17 manually, an appropriate push rod can be passed through the small holes to engage the surface of the mounting member and urge it away from the disc shaped element while holding the element.

From all of the foregoing, it will be evident that the present invention has provided an improved centering fixture for optical encoders providing certain advantages not heretofore available.

I claim:

1. An optical encoder assembly and centering fixture to be used on a motor shaft of given diameter, including, in combination:
    (a) a mounting member carrying a light source adjacent to a peripheral point and having a central bore of greater diameter than said given diameter of the shaft of said motor and wherein said light source is positioned at a proper radial distance from the axis of said shaft for proper alignment with the remaining components of the assembly only when said mounting member is centered on the motor with said shaft extending through said central bore in exact coaxial relationship therewith;
    (b) a centering fixture comprising a disc shaped element having a central hole of diameter corresponding to said given diameter of said shaft to receive said shaft in a friction fit, said element further including
    (c) a reduced external diameter portion through which said hole passes in coaxial relationship, the reduced external diameter of said portion corresponding to the internal diameter of said central bore of said mounting member so that said reduced external diameter portion is receivable in a friction fit in said central bore whereby when the hole in said element receives said shaft, and the reduced external diameter portion of said element is received in said central bore, said mounting member is precisely centered in coaxial relationship to said shaft and may be secured to said motor, said disc shaped element thereafter being removed from said shaft so that the remaining components of said optical encoder assembly can be properly assembled on said mounting member with assurance that said light source is properly positioned.

2. The subject matter of claim 1, in which said disc shaped element includes peripheral cut-outs to permit fastening means to pass through said mounting member and to said motor when said reduced external diameter portion is received in said central bore to thereby enable securement of said mounting member to said motor in its centered position.

3. The subject matter of claim 2, in which said disc shaped element further includes at least two circumferentially spaced small holes between its said reduced external diameter portion and periphery, running parallel to the axis of said disc shaped element so that said reduced external diameter portion can be worked loose from said central opening by passing a push rod through the small holes to engage the surface of said mounting member and urge it away from the disc shaped element while holding the element in the event the friction fit of said reduced external diameter portion in said central bore is such as to render manual removal difficult.

* * * * *